April 28, 1970  E. STUMM  3,508,566
APPARATUS FOR THE CONTINUOUS INDICATION AND AUTOMATIC REGULATION
OF THE VISCOSITY OF A LIQUID
Filed Sept. 6, 1966  2 Sheets-Sheet 1
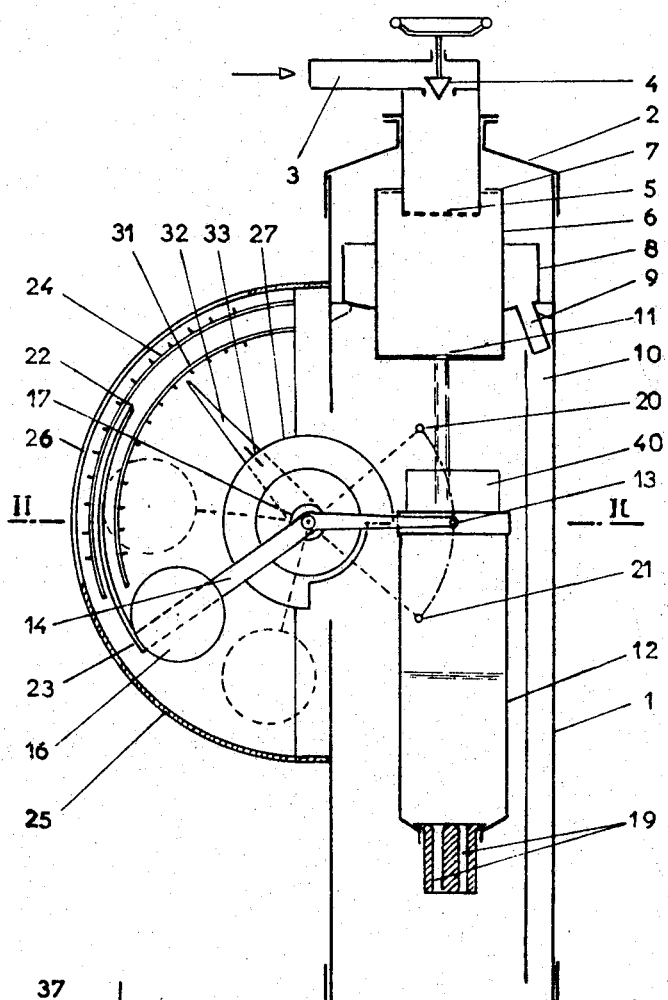
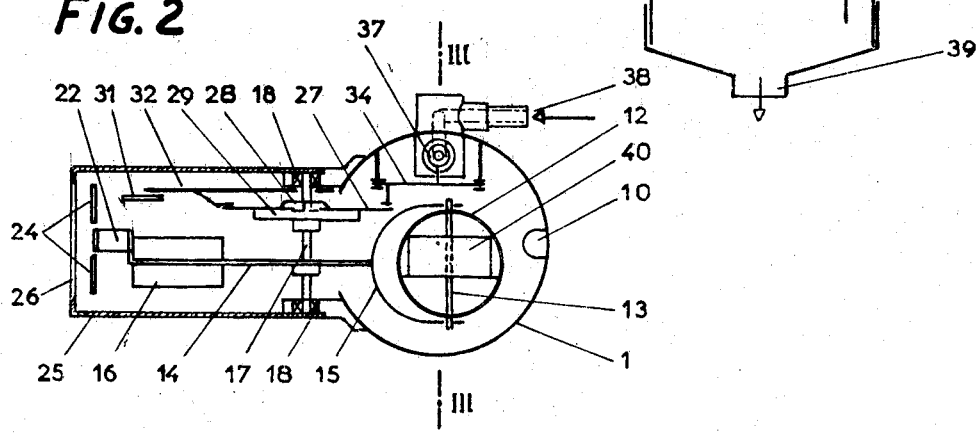

April 28, 1970            E. STUMM            3,508,566
APPARATUS FOR THE CONTINUOUS INDICATION AND AUTOMATIC REGULATION
OF THE VISCOSITY OF A LIQUID
Filed Sept. 6, 1966            2 Sheets-Sheet 2

United States Patent Office 3,508,566
Patented Apr. 28, 1970

3,508,566
APPARATUS FOR THE CONTINUOUS INDICATION
AND AUTOMATIC REGULATION OF THE
VISCOSITY OF A LIQUID
Eric Stumm, 2 Rue Andrieux, Strasbourg,
Bas-Rhin, France
Filed Sept. 6, 1966, Ser. No. 577,409
Claims priority, application France, Sept. 13, 1965,
8,410, Patent 1,446,894
Int. Cl. G05b *13/00, 21/00;* G01r *11/00*
U.S. Cl. 137—92                           1 Claim

ABSTRACT OF THE DISCLOSURE

An apparatus for the continuous indication and automatic regulation of the viscosity of a liquid, which comprises a supply device for liquid to be regulated and a manually operated valve for regulating the delivery of the liquid. An upper fixed vessel is disposed below and receiving the supply device, as well as having an overflow at its upper part. An overflow collector surrounds the upper fixed vessel and has an outlet and a flow conduit receives the discharge of the overflow collector. The upper fixed vessel has a bottom with an orifice and a movable lower vessel receives the discharge of the upper vessel. A spindle suspends the movable lever device on a weighing device. The weighing device comprises an angled lever having a fork at one end which supports the spindle with the movable lower vessel, while a counterweight is secured to the other end of the lever. A rotation spindle supports the lever intermediate its ends and an arc-shaped pointer is secured to the counter-weight carrying end of the lever. Finally, two circular dials having graduations are in operative connection with the pointer and means are also provided for regulating the flow of a diluent in response to the rotation of the spindle.

---

Figure 3:
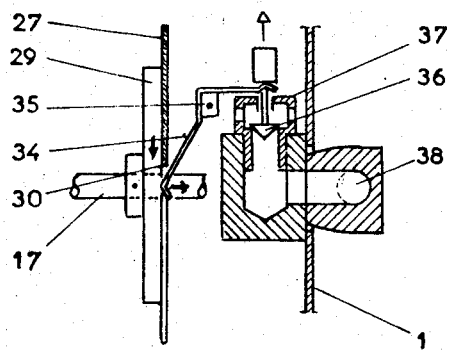

The present invention relates to an apparatus for the continuous indication and automatic regulation of the viscosity of a liquid.

Viscosity indicating and regulating apparatuses are utilised for the supervision, in continuous fashion, of the viscosity of a liquid and for ensuring a constant value thereof, in certain manufacturing processes.

When the apparatuses are simultaneously indicators and regulators, for their operation they generally require an external energy source, for example electrical energy or compressed air, etc., which supplements the necessary energy for ensuring the circulation of the liquid through the viscosity meter.

These solutions frequently make use of electronic equipment, leading to burdensome apparatus the maintenance and repair of which necessitate the intervention of specialised personnel.

It is one object of the present invention to provide an apparatus for the indication and regulation of the viscosity of a liquid, the principle of operation of which apparatus avoids these drawbacks.

It is another object of the present invention, in which the principle consists essentially in the utilisation of the properties of gravity flow of the liquid, the viscosity of which it is desired to supervise, through two orifices of special forms, arranged in the bottom of two capacities or measuring vessels, which are consecutive and disposed one above the other. The first fixed capacity or upper vessel, which is open at the top and supplied with the liquid to be supervised, comprises a circular overflow and an overflow collector, so as to keep its level constant by a slight, continuous overflowing. The bottom of the vessel comprises a diaphragm equipped with an orifice of the thin-wall type.

The usual use of diaphragms for delivery measurements takes place at sufficiently high Reynolds numbers ensuring a constant coefficient of delivery. This implies quite high passage speeds and sufficiently large orifice diameters, especially when it is a matter of the flow of a liquid in a gas, in the present case atmospheric air.

The conditions of utilisation foreseen for the apparatuses forming the object of the present invention impose restrictive conditions upon dimensions and function. In particular the apparatus must be of quite small dimensions to facilitate its installation. Moreover the flow of the liquid to be supervised which is necessary for the supply of the apparatus must remain small.

Systematic tests have shown that thin-wall type orifices of small diameter, of the order of a few millimetres, supplied under a low, constant, pressure head of the order of a few centimeters, possess very remarkable properties in the sphere of low and very low Reynolds numbers.

In particular these remarkable properties consist in that at constant head the delivery of the orifice remains substantially constant, or at least presents only slight variations of delivery in a positive or negative direction, when the Reynolds number, that is the viscosity of the fluid, varies within quite wide limits.

On the basis of these remarkable properties of flow of small orifices, the apparatus is further designed so as to cause the liquid to flow by gravity from the upper reservoir into a second, downstream vessel open at the top, this second vessel being itself equipped at the bottom with a nozzle comprising essentially a smooth flow passage, or a plurality of parallel smooth flow passages, of circular section, the diameters and lengths of which are suitably dimensioned so that the flow of the liquid through them takes place in laminar fashion. The free level of the liquid in the lower capacity will then essentially be a function of the loss of laminar head in the nozzle, since the dynamic pressure necessary to ensure the speed of flow will be a substantially constant term and the entry loss of the passages of the nozzle will be reduced to the minimum by suitable rounding.

The first function to be fulfilled by the apparatus, that is to say that of indicating the viscosity, can be carried out for example by a device for weighing the second vessel with the liquid mass which it contains, or measuring the level or the pressure at the bottom of the reservoir. These variable values, which are a function of the viscosity, can be transmitted by an indicator needle moving before a scale, the graduation of which will be obtained by test gauging and can be expressed directly in units of viscosity.

The second function of the apparatus, that is to say that of an automatic viscosity regulator, can be carried out advantageously by a cam device the movement of which will be fast with that imparted to the indicator needle, this cam directly controlling a corrector system, for example by actuating the needle of a valve controlling the passage of the diluent which is mixed with the liquid. In the case where the quantity of diluent is very great or if the action upon the correction value requires greater forces or remote action, the control can be effected by the action of the cam upon electric or pneumatic relays.

The apparaus can be utilised for a very wide range of variation of the viscosity, while retaining good precision. The different measurement ranges are obtained simply by exchanging the part comprising the calibrated nozzle passages which are dimensioned in proportion to the different viscosity ranges, on the bottom container.

Figure 4:
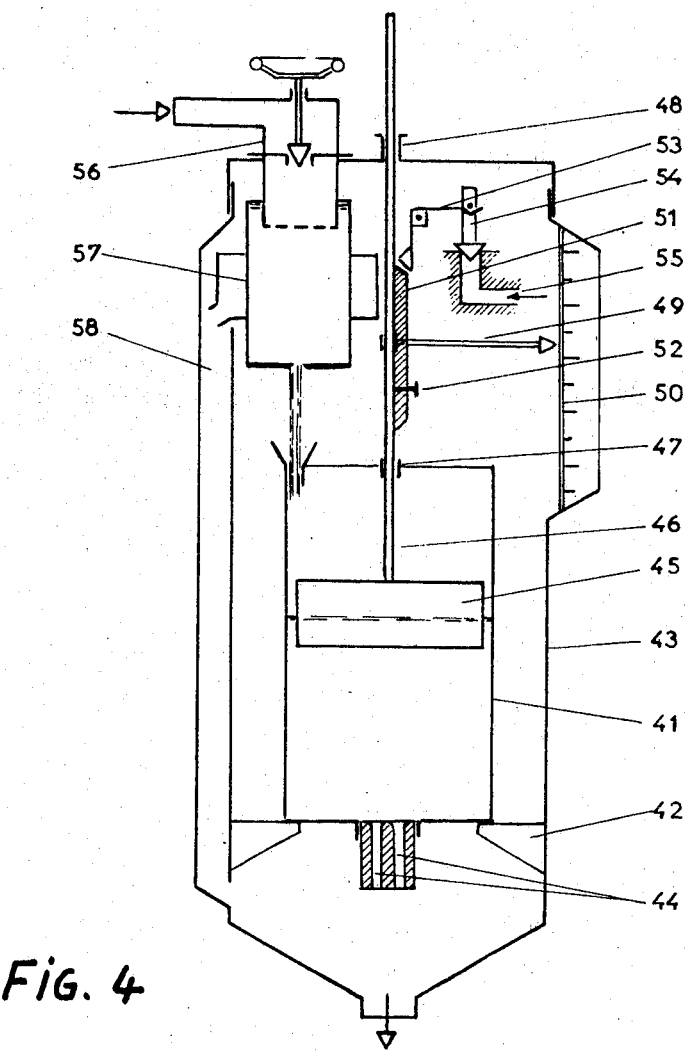

With these and other objects in view, which will become apparent in the following detailed description, the present invention will be clearly understood in connection with the accompanying drawings, in which:

FIGURE 1 represents, in longitudinal section, the viscosity indicating and regulating apparatus fitted with a measurement system operating by weight with counterweight, FIGURE 2 represents a cross-section along the lines II—II in FIGURE 1, FIGURE 3 is a fragmentary sectional view from the left, along the line III—III in FIGURE 2, and FIGURE 4 represents a viscosity indicating and regulating apparatus with measurement system operating by a float, seen in longitudinal section.

In the drawings, the device as represented in FIGURES 1, 2 and 3 comprises a casing 1 consituted by a tube closed with an upper lid 2 which comprises the supply device for the liquid to be supervised, which arrives at the entrance conduit 3. The delivery of the liquid is regulated manually by means of a valve 4 and the liquid is passed through a filter 5 into the upper fixed vessel 6, which is provided with a circular overflow 7 at its upper part and with an overflow collector 8 having an outlet 9 discharging into the flow conduit 10.

The bottom of the upper vessel 6 is equipped with a thin-wall orifice 11 discharging into the movable lower vessel 12, which is suspended by a spindle 13 on a weighing device which comprises an angled lever 14 provided with a fork 15 which supports the spindle 13 with the vessel 12, the arm of which lever supports a counterweight 16, the whole system being mobile about the rotation spindle 17, which is guided by the two ball bearings 18.

The bottom of the lower vessel 12 comprises an interchangeable part having the calibrated nozzle passages 19 which determine the level and consequently the mass of the liquid in the lower container.

The extreme swing positions of the weighing system are indicated by the points 20 and 21 which correspond respectively to the minimum and maximum viscosities. To each intermediate value of the viscosity there corresponds an angular position of equilibrium of the system.

The pointer 22, which is bent into an arc of a circle and fixed to the end 23 of the angled lever 14, moves between the graduations of two circular dials 24, each of these dials situated inside a casing 25 with reading window 26 corresponding to a specific measurement range. Transference from one to the other is effected by exchanging the calibrated nozzle passage.

Regulation is effected by a device comprising an indented cam disc 27 frictionally mounted through the intermediary of a spring 28 on the hub 29 fast with the rotation spindle 17. The edge of the indentation 30 of the cam disc 27, being adjusted to the angular value corresponding to the desired viscosity read on the setting scale 31 with the aid of the seting pointer 32 and the reference mark 33 of the cam disc 27, causes the small lever 34 to rock about the fixed spindle 35, and raises the needle 36 of the valve 37, clearing the passage for the diluent to arrive at the conduit 38 through the valve support. The diluent and the liquid flow to the bottom of the apparatus through the orifice 39. A jet deflector 40 placed at the entry of the lower reservoir avoids the formation of air bubbles in the liquid. The action of the counterweight 16 can equally be replaced by the action of a spring.

The jet deffector 40 can also be fixed to the upper reservoir 6 and dip into the lower reservoir 12, thus acting simultaneously as guide tongue for the jet and as damper.

FIGURE 4 represents a variant of design of the viscosity indicating and regulating apparatus, when it is desired to use the variable level of the fixed lower vessel 41 resting on the brackets 42 of the casing 43 and comprising a detachable part with calibrated nozzle passages 44 in its bottom.

The float 45 with its rod 46, moving in guides 47 and 48, transmits its movement to an indicator needle 49 which moves before a graduated scale 50.

The cam 51 movable on the rod 46 is made fast with the latter by the locking screw 52 in the position corresponding to a desired viscosity value, and controls the angle lever 53 which lifts the valve needle 54, permitting the flow of diluent arriving at the conduit 55.

The liquid supply device 56 and the upper reservoir 57 with the overflow discharge 58 are analoguous with those described in connection with the previous apparatus.

While I have disclosed two embodiments of the present invention, it is to be understood that these combinations are given by example only and not in a limiting sense.

I claim:

1. An apparatus for the continuous indication and automatic regulation of the viscosity of a liquid, comprising
a supply device for liquid to be regulated,
a manually operated valve for regulating the delivery of said liquid,
an upper fixed vessel disposed below and securing said supply device, as well as having an overflow at its upper part,
an overflow collector surrounding said upper fixed vessel and having an outlet,
a flow conduit receiving the discharge of said overflow collector,
said upper fixed vessel having a bottom with an orifice,
a movable lower vessel receiving the discharge of said upper vessel,
a spindle suspending said movable lower device on a weighing device,
said weighing device comprising an angled lever having a fork at one end,
said fork supporting said spindle with a movable lower vessel,
a counter-weight secured to the other end of said lever,
a rotary spindle supporting said lever intermediate its ends,
a casing having a reading window including bearing means for rotatably supporting said spindle,
said movable lower vessel having at its bottom calibrated nozzle-passages adapted to determine the level and thereby the mass of said liquid in said movable lower vessel,
an arc-shaped pointer secured to said counter-weight carrying end of said angled lever,
two circular dials having graduations and being disposed in said casing,
means for regulating the flow of a diluent in response to the rotation of said spindle,
said means for regulating the flow of said diluent comprising,
    a cam disc having an indentation,
    said cam disc being frictionally spring-biased mounted on a hub of said spindle,
said indentation being adjusted to the angular value corresponding to a predetermined viscosity,
a setting scale in said casing,
a setting pointer turnable about said spindle and turning along said setting scale,
said cam disc having a reference mark for said setting pointer,
a second lever rocking about a fixed spindle by engagement with an edge of said indentation,
a passage for said diluent including a valve having a needle, and
said second lever raising and lowering, respectively, said valve needle for clearing more or less the passage for said diluent.

References Cited

UNITED STATES PATENTS 2,316,230 4/1943 Endres.
2,998,019 8/1961 Adelson _____ 137—92

WILLIAM F. O'DEA, Primary Examiner
H. M. COHEN, Assistant Examiner

U.S. Cl. X.R.

73—56; 116—129; 137—551; 177—237; 251—251